United States Patent [19]

Pitts et al.

[11] Patent Number: 5,335,185
[45] Date of Patent: Aug. 2, 1994

[54] AUTOMATIC LEVEL CONTROL SYSTEM AND METHOD

[75] Inventors: Alan J. Pitts, Comanche; Charles E. Fowler, Duncan, both of Okla.

[73] Assignee: Halliburton Company, Duncan, Okla.

[21] Appl. No.: 873,919

[22] Filed: Apr. 24, 1992

[51] Int. Cl.$^5$ .................. G01G 11/08; G05D 9/00
[52] U.S. Cl. .................. 364/510; 364/479; 364/153; 222/56
[58] Field of Search ......... 364/509, 510, 502, 153, 364/172, 468, 469, 478, 479, 567, 568; 137/101.21; 222/1, 56, 64; 366/17, 18, 43, 132, 152, 153

[56] References Cited

U.S. PATENT DOCUMENTS

| | | | |
|---|---|---|---|
| 2,430,407 | 11/1947 | Nelson | 214/17 |
| 2,658,644 | 11/1953 | Lowe | 222/52 |
| 3,245,584 | 4/1966 | Linville | 222/57 |
| 3,329,313 | 7/1967 | Mayer | 222/58 |
| 3,362,585 | 1/1968 | Nessim et al. | 222/55 |
| 3,807,602 | 4/1974 | Meichsner | 222/1 |
| 3,935,970 | 2/1976 | Spaw | 222/56 |
| 4,111,272 | 9/1978 | Ricciardi et al. | 177/50 |
| 4,111,335 | 9/1978 | Arya et al. | 222/57 |
| 4,111,336 | 9/1978 | Ward et al. | 222/58 |
| 4,170,311 | 10/1979 | Spaw | 414/289 |
| 4,219,133 | 8/1980 | Sinsky | 222/39 |
| 4,265,266 | 5/1981 | Kierbow et al. | 137/101.19 |
| 4,353,482 | 10/1982 | Tomlinson et al. | 222/1 |
| 4,427,133 | 1/1984 | Kierbow et al. | 222/77 |
| 4,498,783 | 2/1985 | Rudolph | 366/132 |
| 4,553,880 | 11/1985 | Byrd, Jr. et al. | 406/23 |
| 4,635,819 | 1/1987 | Wilson et al. | 222/58 |
| 4,701,095 | 10/1987 | Berryman et al. | 414/332 |
| 4,709,143 | 11/1987 | Henderson | 250/222.1 |
| 4,745,293 | 5/1988 | Christensen | 250/577 |
| 4,747,060 | 5/1988 | Sears, III et al. | 364/481 |
| 4,751,648 | 6/1988 | Sears, III et al. | 364/422 |
| 4,788,444 | 11/1988 | Williams | 250/577 |
| 5,004,400 | 4/1991 | Handke | 414/786 |
| 5,027,267 | 6/1991 | Pitts et al. | 364/172 |

Primary Examiner—Thomas G. Black
Assistant Examiner—Michael Zanelli
Attorney, Agent, or Firm—James R. Duzan; E. Harrison Gilbert, III

[57] ABSTRACT

An automatic level control system and method provide continuous proportional control of an inlet valve when the level of material in a storage container is between low and high limits. The system includes a main feedback loop and a nested feedback loop to insure proper control of the inlet valve through which material is added to the storage container. The main feedback loop provides a control signal indicating the desired setting of the inlet valve, and the nested feedback loop provides a control signal indicating the actual position of the inlet valve so that the two control signals can be compared for use in accurately moving the inlet valve to the desired position. The main feedback loop includes a computer into which different density values can be input for accurately determining the amount of material in the container as indicated by a weight sensor.

10 Claims, 2 Drawing Sheets

AUTOMATIC LEVEL CONTROL SYSTEM AND METHOD

BACKGROUND OF THE INVENTION

This invention relates generally to an automatic level control system and method. In a particular application, the present invention relates to such a system and method for continuously maintaining the level of dry, powdered material between lower and upper limits in a surge tank prior to mixing the material into a slurry to be pumped into an oil or gas well.

In the oil and gas industry, cement slurry is mixed at a well site prior to the slurry being pumped downhole for cementing a tubing string, such as casing, in the well, for example. Other types of mixtures can be made and used at well sites. Considering cement by way of example, powdered cement is typically added in controlled amounts into the slurry mixture from a surge tank into which bulk powdered cement is added to replenish the supply in the surge tank. It is desirable to keep at least a minimum level of the dry cement in the surge tank to assist the gravity flow of the cement out of the surge tank. It is desirable to keep the level of the dry cement below a maximum level to prevent overflowing the surge tank.

In the past, one type of surge tank has had two sight glasses, or windows, through which a human operator could look to see if the level of the cement in the tank was between the lower and upper limits defined by the locations of the sight glasses. If the operator were to see the material drop below the lower sight glass, an inlet valve would be opened to allow more material to flow into the surge tank. If the operator were to see the material rise above the upper sight glass, the valve would be closed to stop the flow of material into the surge tank. In this manner the level of material in the surge tank would be contained between the defined limits. A disadvantage of this technique, however, is that the material often coats the sight glasses, thereby making it difficult to determine when the material actually drops below the lower sight glass or rises above the upper sight glass.

In another type of control for a surge tank, a single feedback loop is used. For example, the weight of the surge tank is sensed and a responsive signal is generated to adjust the position of a valve controlling the input of the material into the surge tank. The single feedback loop functionally comprises sensing the weight and generating a valve control signal in response, typically to either open or close the valve.

There is the need for an improved system and method with which to control the flow of material into the surge tank, and thereby the level of the supply of material in the surge tank. Such system and method should provide for continuously controlling an inlet valve when the level of the material in the surge tank is between lower and upper limits. Such system and method should also utilize a main control loop generally of the type described above, but in conjunction with a nested control loop that insures the inlet valve is at the desired position indicated by the main control loop. Such a system and method should also be readily adaptable to control materials of different densities.

SUMMARY OF THE INVENTION

The present invention overcomes the above-noted and other shortcomings of the prior art by providing a novel and improved automatic level control system and method. The present invention satisfies the aforementioned needs so that, in the specific application of controlling the level of cement in a surge tank at an oil or gas well, a steady flow of dry, powdered cement into a cement mixing manifold can be obtained. The automatic control provided by the present invention can also reduce the number of personnel needed to mix the cement into the slurry.

The apparatus of the present invention comprises: storage means for receiving a material; weight sensing means for sensing the weight of the material in the storage means; means, responsive to the weight sensing means, for providing a control signal; valve means for controlling the flow of the material into the storage means, the valve means providing a material flow passageway adjustable through a range of states from fully closed to fully opened; feedback means for sensing the state of the passageway to which the valve means is adjusted; and means for adjusting the state of the passageway of the valve means in response to the control signal and the feedback means. The means for providing a control signal preferably includes a programmed microcomputer connected to the weight sensing means and the means for adjusting. This programmed microcomputer includes means for generating the control signal in response to a computed proportional relationship between the sensed weight of the material in the storage means and a predetermined range between a low limit and a high limit.

The method of the present invention comprises: sensing weight of dry material in a surge tank; comparing the sensed weight to predetermined criteria and generating a control signal in response thereto; sensing the state of a valve through which dry material is input to the surge tank; and controlling the state of the valve in response to the control signal and the sensed state of the valve. Generating a control signal preferably includes: generating the control signal to fully open the valve when the sensed weight is less than a predetermined low limit criterion, and generating the control signal to fully close the valve when the sensed weight is greater than a predetermined high limit criterion, and generating the control signal to operate the valve to a proportionately open position between fully open and fully closed in response to the proportion the sensed weight is below the high limit criterion relative to the range between the low limit criterion and the high limit criterion.

Therefore, from the foregoing, it is a general object of the present invention to provide a novel and improved automatic level control system and method. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1:
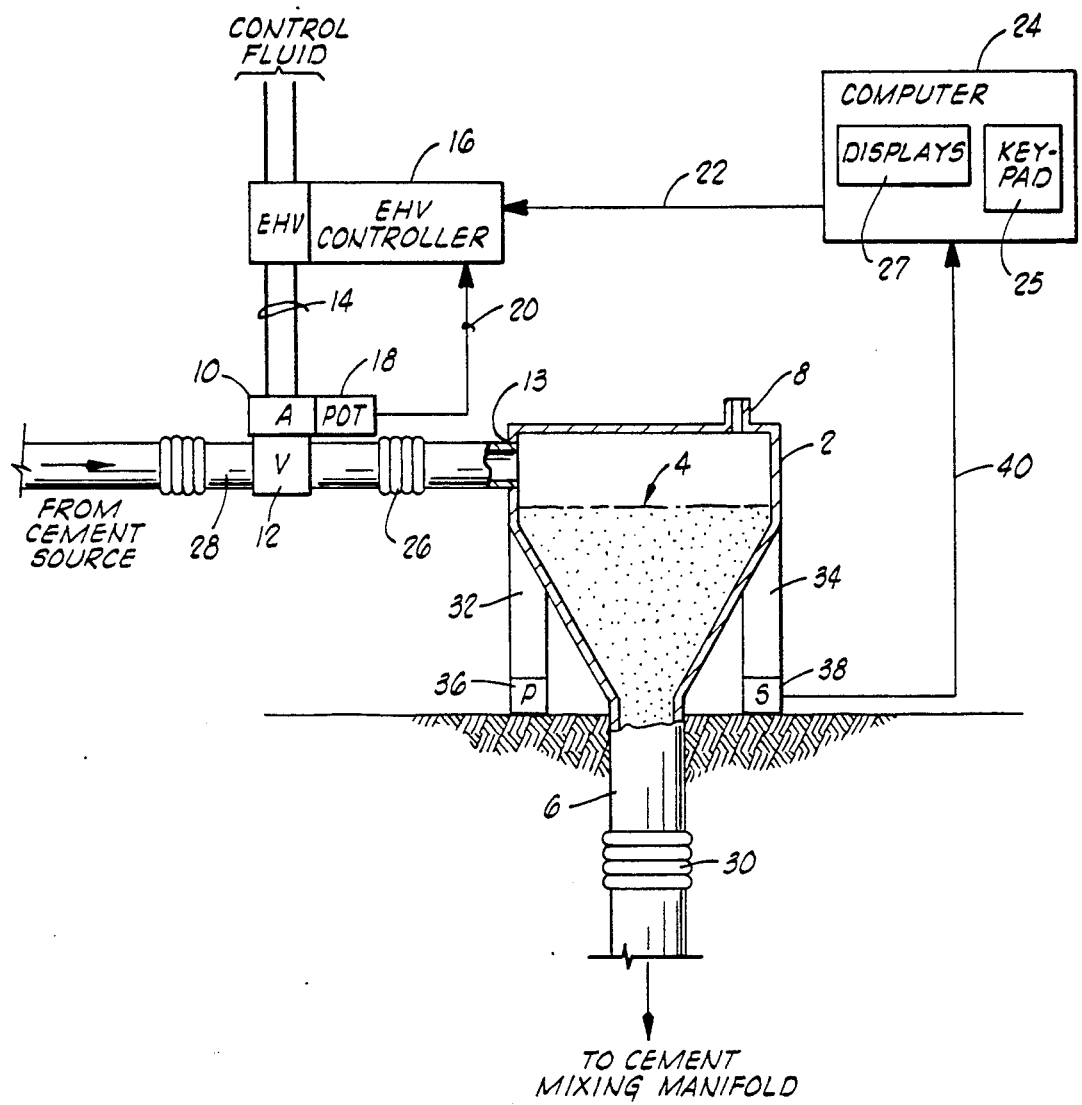
FIG. 1 is a schematic and block diagram of the automatic level control system of the preferred embodiment of the present invention.

Referring to FIG. 1, a surge tank 2 is used to receive and store material 4, such as dry, powdered cement, under such conditions as to deliver material 4 through outlet pipe 6 to a mixing manifold (not shown). Systems already exist which prepare the material 4 for ease of flow by aeration and pressurization of the material 4 in surge tank 2. It is also desirable to control the level of the material 4 in surge tank 2 between lower and upper limits to further steady the flow of material 4 through outlet pipe 6. As the level of material 4 in surge tank 2 lowers, the output flow rate reduces. Ultimately, the flow of material 4 through outlet pipe 6 will stop when surge tank 2 empties. As the level of material 4 in surge tank 2 rises, the output flow rate increases. Ultimately, the material 4 will flow out vent 8 when surge tank 2 overfills.

The system of the present invention further includes a valving apparatus having an actuator 10 and an inlet flow control valve 12 connected in such a manner that movement of actuator 10 will cause a corresponding movement of valve 12. Actuator 10 and valve 12 control the flow of the material received in the storage surge tank 2 through an inlet 13 thereof to which valve 12 is connected. Valve 12, as operated by actuator 10, provides a material flow passageway that is adjustable through a range of states from fully closed to fully open.

Hydraulic lines 14 are connected to actuator 10 in such a manner that flow of hydraulic fluid through hydraulic lines 14 will operate actuator 10. A control valve apparatus 16, which includes both an electrohydraulic valve and an electrohydraulic valve controller, is connected to hydraulic lines 14 in such a manner that the valve of the apparatus 16 can direct hydraulic fluid through hydraulic lines 14 for providing operating fluid to the actuator 10 for controlling the inlet valve 12.

A variable resistance, specifically a potentiometer 18, is mechanically connected to actuator 10 of the inlet valve apparatus in such a manner that movement of actuator 10 will cause a voltage change across potentiometer 18. An electrical cable 20 is connected to potentiometer 18 in such a manner as to communicate voltage changes of potentiometer 18 to the controller portion of the control valve apparatus 16. This provides one feedback means for sensing the state of the passageway to which the inlet valve 12 is adjusted. Other types can likely be used.

Electrical cable 22 is connected to the controller of control valve apparatus 16 in such a manner as to allow voltage changes communicated through electrical cable 22 to be sensed in the controller of control valve apparatus 16. Computer 24 is connected to electrical cable 22 to allow voltage changes generated in computer 24 to be communicated to the controller of the control valve apparatus 16.

The controller of control valve apparatus 16 is constructed to allow voltage imbalances between the signals communicated via cable 22 and cable 20 to cause operation of the electrohydraulic valve of the apparatus 16 whereby hydraulic fluid is appropriately directed through hydraulic lines 14, thereby controlling the position of the inlet valve 12 via the hydraulically operated actuator 10. The net result of the construction by which the foregoing is obtained is to allow computer 24 to control the position of valve 12 as insured by the feedback from potentiometer 18. Thus, the state of the inlet valve 12, and the passageway provided therethrough, is adjusted in response to both the control signal from computer 24 and the feedback signal from potentiometer 18.

Flexible coupling 26 is connected to inlet pipe 28 in which valve 12 is connected, and flexible coupling 30 is connected to outlet pipe 6 in such a manner as to allow movement of surge tank 2 relative to the inlet and outlet structures. Legs 32 (only one shown) and leg 34 are connected to surge tank 2 to support the weight of surge tank 2. Pivots 36 (only one shown) are connected to legs 32 to allow movement of tank 2 relative to the stationary supporting surface for the legs. Weight sensor 38 is connected to leg 34 to allow the weight of tank 2 and the weight of material 4 to cause electrical current or frequency changes through weight sensor 38. Electrical cable 40 is connected to weight sensor 38 to communicate the electrical changes generated as control signals by weight sensor 38 to computer 24. This allows computer 24 to generate control signals in response to the sensed weight of surge tank 2 and material 4.

Computer 24 is preferably a microcomputer. It is constructed to allow a human operator to instruct computer 24 as to the density of material 4, and as to the desired level of material 4 in surge tank 2. Computer 24 is further constructed to allow a human operator to define in the computer 24 a data base containing various details about the system computer 24 is controlling. These details include, but are not limited to, the volume of surge tank 2, the empty weight of surge tank 2, upper and lower limit values, characteristics of the flow of material 4 through valve 12 with due regard to the position of valve 12, and characteristics of weight sensor 38 with due regard to the weight of surge tank 2 and material 4.

Computer 24 is further constructed to allow computer 24 to control the position of valve 12 with due regard to the weight of surge tank 2 and material 4. In particular, as the weight of material 4 in surge tank 2 is reduced fractionally by the flow of material 4 out of surge tank 2 through outlet pipe 6, computer 24 will cause valve 12 to open fractionally, causing more material 4 to flow through inlet pipe 28 into surge tank 2. Additionally, as the weight of material 4 in surge tank 2 is increased fractionally by the flow of material through inlet pipe 28 into surge tank 2, computer 24 will cause valve 12 to close fractionally, causing less material to flow through inlet pipe 28 into surge tank 2.

The foregoing are achieved at least in part by computer keypad 25 through which data entry can be effected (including changes thereto) and by suitable programming contained in the computer 24. Information can be displayed from computer displays 27.

Computer 24 can be programmed in numerous ways concerning how best to maintain the level of the material 4 in the tank 2; however, the way selected for the preferred embodiment is exclusively proportional control (i.e., no feedforward, integral or derivative control) since the position of the valve 12 is controlled directly proportional to the relationship of the actual level of material to a desired range between a low (or lower) limit criterion and a high (or upper) limit criterion. The net result is that as material is consumed through outlet pipe 6, valve 12 will open to maintain the level in the surge tank 2 above the lower limit. As the rate that material is consumed through outlet pipe 6 increases, valve 12 will open wider. As the rate that material is consumed through outlet pipe 6 decreases below the rate at which material is delivered through inlet pipe 28, valve 12 will close to maintain the material in surge tank 2 below the high limit. Due to the choice of a proportional control loop to maintain the level of material in surge tank 2, as the rate material is consumed through outlet pipe 6 approaches some steady state value, the level of material in surge tank 2 will approach some steady state value. The distance this level is below the upper limit will be proportional to the rate that material is being consumed through outlet pipe 6 as long as the rate that material is being consumed through outlet pipe 6 does not exceed the maximum rate that material can be delivered through inlet pipe 28.

The specific proportionality control achieved by the present invention uses a selected density value for the material received in the storage container provided by surge tank 2. One or more density values can be entered via keypad 25 or programmed into computer 24. Using the selected density value, and an entered or programmed value for the storage volume of surge tank 2, computer 24 computes the maximum amount of material that can be received in surge tank 2. This is done by multiplying the density value by the storage volume.

Using the calculated maximum amount of material that can be stored, computer 24 computes the low and high limit criteria. This is done in the preferred embodiment by arbitrarily selected percentages to be applied to the maximum amount. In a specific implementation, the low limit is set at seventy percent of maximum and the high limit is set at ninety percent of maximum. These limits are defined within computer 24 in terms consistent with the nature of the signal received from weight sensor 38 to indicate how much material is actually in surge tank 2. For example, these limit values for pounds of material in the surge tank 2 can be defined in terms of current or frequency values corresponding to a current or frequency type output from weight sensor 38 (i.e., the computer 24 is programmed or instructed as to how many milliamperes of current or hertz of frequency is a result of how many pounds of material).

Once the needed criteria have been determined as by data entry, retrieval or computation (and thus predetermined relative to subsequent steps), computer 24 reads the signal from weight sensor 38 and compares it to the low and high limit values. In the preferred embodiment, weight sensor 38 is calibrated to provide zero output under loading of surge tank 2 when it is empty; therefore, the output directly indicates the amount of material contained in surge tank 2 (that is, calibration effectively provides a subtraction of the tank weight from the total weight to yield material weight). Computer 24 then displays the sensed weight via displays 27 and compares the actual weight signal with the low and high limits.

If the actual amount of material is below the low limit, computer 24 generates a control signal to fully open valve 12; and if the actual amount of material is above the high limit, computer 24 generates a control signal to fully close valve 12.

If the actual amount of material is between the low and high limits, proportional control occurs. That is, computer 24 generates a control signal to move valve 12 to an open position or state in proportion to how much the actual amount of material in surge tank 2 is below the high limit relative to the range defined by the difference between the high and low limits. For example, if the actual amount of material in surge tank 2 is one-fourth below the high limit within the range between the high and low limits, computer 24 generates a control signal to cause valve 12 to be at a one-fourth open position or state. The foregoing can, of course, be defined in other, equivalent terms such as relative to the low limit and how much valve 12 is closed rather than open, or relative to the low limit and taking the complement to define the open state of valve 12. The foregoing can be defined by the following equations:

(a) relative to high limit: (high limit − actual amount of material 4 in surge tank 2)/(high limit − low limit) = proportion valve 12 to be opened [(1 − this proportion) defines complementary closed state of valve 12]

(b) relative to low limit: (actual weight of material 4 in surge tank 2 − low limit)/(high limit − low limit) = proportion valve 12 to be closed [(1 − this proportion) defines complementary open state of valve 12]

From the foregoing it is apparent that the present invention provides continuous proportional control of valve 12 throughout the range between the low and high limits.

The programmed computer 24 provides the means for implementing the foregoing control. That is, computer 24 operating under suitable program control with the necessary input data provides means for performing the aforementioned operations. A flow chart of a program for computer 24 implementing the control explained above is shown in FIG. 2.

Devices for implementing the foregoing elements of the present invention are individually known in the art, except that a particular implementation of the computer 24 must be programmed in accordance with the control technique described hereinabove. See, for example, U.S. Pat. No. 5,027,267 to Pitts et al., U.S. Pat. No. 4,747,060 to Sears, III, et al., U.S. Pat. No. 4,751,648 to Sears, III, et al., U.S. Pat. No. 4,353,482 to Tomlinson et al., U.S. Pat. No. 4,265,266 to Kierbow et al., and U.S. Pat. No. 4,427,133 to Kierbow et al., all of which patents are incorporated herein by reference.

The foregoing system shown in FIG. 1 can be used to perform the method of the present invention. This method includes steps of performing the various functions or operations explained above and will only briefly be summarized here.

Figure 2:
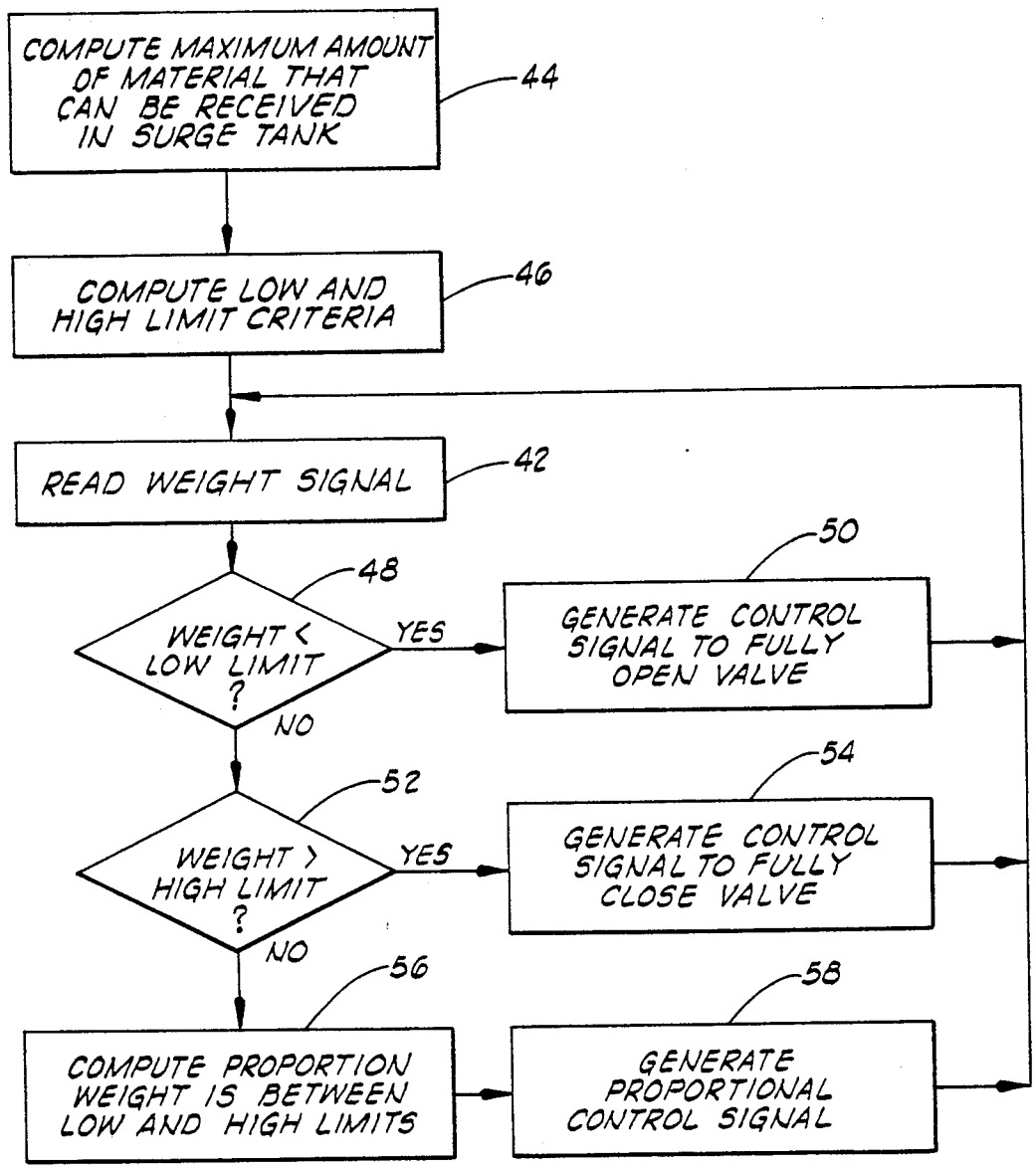
FIG. 2 is a flow chart of a program for a programmed computer of the preferred embodiment system.

To continuously replenish dry material in surge tank 2 in accordance with the method of the present invention, the weight of the dry material in surge tank 2 is sensed via weight sensor 38 (see also reference numeral 42 in FIG. 2). The sensed weight is compared to predetermined criteria (i.e., the low and high limits such as computed as explained above and depicted at reference numerals 44, 46 in FIG. 2) and a control signal is generated in response. The state of material inlet valve 12 is sensed via potentiometer 18. This state is controlled in response to both the control signal from computer 24 and a control signal from potentiometer 18 indicating the sensed state of valve 12.

As explained above, the main control signal (i.e., the one that defines the desired position for the valve member of valve 12, which signal comes from computer 24) is generated (a) to fully open valve 12 when the sensed weight of material 4 in surge tank 2 is less than the predetermined low limit criterion (see reference numerals 48, 50 in FIG. 2), (b) to fully close valve 12 when the sensed weight of material 4 in surge tank 12 is greater than the predetermined high limit criterion (see reference numerals 52, 54 in FIG. 2), and (c) to operate valve 12 to a proportionately open position between fully open and fully closed in response to the proportion the sensed weight of material 4 in surge tank 2 is below the high limit criterion relative to the range between the low limit criterion and the high limit criterion (or as equivalently defined as explained above) (see reference numerals 56, 58 in FIG. 2).

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An automatic level control system, comprising:
   storage means for receiving a material;
   weight sensing means for sensing the weight of the material in said storage means;
   means, responsive to said weight sensing means, for providing a control signal;
   valve means for controlling the flow of the material into said storage means, said valve means providing a material flow passageway adjustable through a range of states from fully closed to fully open;
   feedback means for sensing the state of the passageway to which said valve means is adjusted;
   means for adjusting the state of the passageway of said valve means in response to the control signal and said feedback means; and
   wherein said means for providing a control signal includes:
   means for entering a selected density value for the material received in said storage means;
   means, responsive to the entered selected density value and the sensed weight of the material received in said storage means, for determining low and high limits and the amount of material received in said storage means relative to the low and high limits; and
   means for generating the control signal in proportional response to the determined relationship between the amount of material received in said storage means and the low and high limits.

2. A system as defined in claim 1, wherein said means for determining includes:
   means for multiplying the entered selected density value and a predetermined material storage volume of said storage means to define a maximum amount of material that can be received in said storage means;
   means for defining the low and high limits in response to the defined maximum amount of material that can be received in said storage means; and
   means for determining a proportionality between the sensed weight and the range between the low and high limits.

3. A system as defined in claim 2, wherein said means for generating the control signal generates the control signal to fully open said valve means in response to the sensed weight being less than the low limit, to fully close said valve means in response to the sensed weight being greater than the high limit, and to proportionately open said valve means in response to the proportionality between the sensed weight and the range between the low and high limits.

4. A system as defined in claim 2, wherein said means for adjusting includes:
   second valve means for providing operating fluid to said first-mentioned valve means; and
   controller means, connected to said second valve means, said feedback means and said means for providing a control signal, for controlling said second valve means in response to the control signal and said feedback means.

5. A system as defined in claim 4, wherein said feedback means includes a variable resistance mechanically connected to said first-mentioned valve means and electrically connected to said controller means.

6. A system for continuously maintaining the level of dry, powdered cement between lower and upper limits, comprising:
   a surge tank wherein the level of dry, powdered cement is to be maintained between lower and upper limits, said surge tank having an inlet through which dry, powdered cement is input into said surge tank;
   a weight sensor responsive to weight of said surge tank and weight of the dry, powdered cement in said surge tank;
   a first valve, said first valve connected to said inlet of said surge tank, and said first valve having a fluid responsive valve member movable through a plurality of positions to adjust the flow of dry, powdered cement into said surge tank;
   a second valve, said second valve connected to said first valve to provide fluid control to said first valve member, and said second valve responsive to electrical control;
   a potentiometer responsive to positioning control of said first valve so that said potentiometer provides an electrical feedback signal in response to the position of said valve member of said first valve;
   a computer connected to said weight sensor; and
   a controller connected to said computer, said potentiometer and said second valve so that said controller operates said second valve in response to an electrical control signal from said computer dependent upon the level of dry, powdered cement in said surge tank as determined in response to the sensed weight of the dry, powdered cement in said surge tank and predetermined criteria in said computer and further in response to said electrical feedback signal from said potentiometer dependent upon the position of the valve member of said first valve, wherein said predetermined criteria in said computer include a selected density value and selected lower and upper level limits and further wherein said computer, said potentiometer and said controller provide continuous control of said first valve when the level of dry, powdered cement in said surge tank is between the predetermined lower and upper limits.

7. A system as defined in claim 6, wherein said computer includes means for changing the density value for the dry, powdered cement.

8. A system as defined in claim 6, further comprising means for pivotally supporting said surge tank relative to said weight sensor.

9. A system as defined in claim 8, further comprising means for flexibly coupling said first valve to said inlet of said surge tank.

10. A method of continuously replenishing dry material in a surge tank, comprising:

sensing weight of dry material in a surge tank;

comparing the sensed weight to predetermined criteria and generating a control signal in response thereto;

sensing the state of a valve through which dry material is input to the surge tank;

controlling the state of the valve in response to the control signal and the sensed state of the valve; and wherein generating a control signal includes generating the control signal to fully open the valve when the sensed weight is less than a low limit criterion predetermined in response to a selected density value, and generating the control signal to fully close the valve when the sensed weight is greater than a high limit criterion predetermined in response to the selected density value, and generating the control signal to operate the valve to a proportionately open position between fully open and fully closed in response to the proportion the sensed weight is below the high limit criterion relative to the range between the low limit criterion and the high limit criterion.

* * * * *